Aug. 14, 1962 H. WALDMAN 3,049,592

METHOD OF CONTROLLING A TERMINAL CIRCUIT BY REMOTE CONTROL AND REMOTE CONTROL APPARATUS

Filed Oct. 23, 1957 2 Sheets-Sheet 1

INVENTOR.
HERBERT WALDMAN

BY Haine and Nydick

ATTORNEYS

Aug. 14, 1962 H. WALDMAN 3,049,592

METHOD OF CONTROLLING A TERMINAL CIRCUIT BY REMOTE CONTROL AND REMOTE CONTROL APPARATUS

Filed Oct. 23, 1957

2 Sheets-Sheet 2

*INVENTOR.*
HERBERT WALDMAN
BY Hane and Nydick
ATTORNEYS

United States Patent Office 3,049,592
Patented Aug. 14, 1962

3,049,592

METHOD OF CONTROLLING A TERMINAL CIRCUIT BY REMOTE CONTROL AND REMOTE CONTROL APPARATUS

Herbert Waldman, Brooklyn, N.Y., assignor, by mesne assignments, to Robosonic National Industries Corp., New York, N.Y., a corporation of Delaware Filed Oct. 23, 1957, Ser. No. 691,831
14 Claims. (Cl. 179—2)

Figure 1:
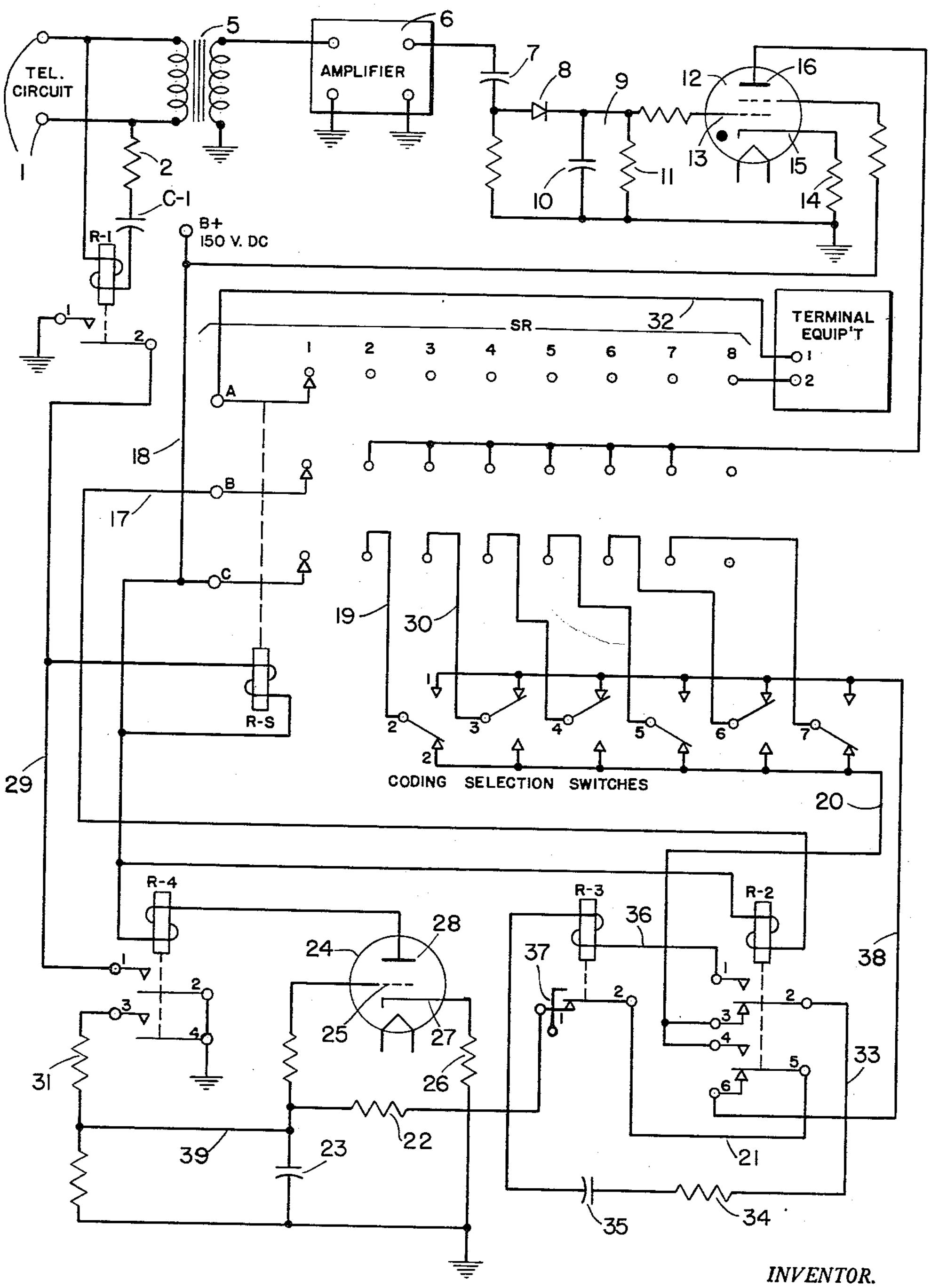

The invention relates to a method of and a circuit system for controlling a terminal circuit by remote control, and more particularly to a method of and a circuit system for controlling a terminal circuit by remote control over a telephone circuit system.

The remote control of a terminal circuit presents few difficulties if the control circuit is designed for the control of the terminal circuit only, and various satisfactory circuit control systems and follow-up systems are available for the purpose. However, various and difficult problems arise when the control circuit used for transmitting the control signals for the terminal circuit is used for the transmission of other signals also, such as the transmission of intelligence over a public telephone installation.

The present invention is concerned with the remote control of the terminal circuit over a transmission system serving other purposes also, especially over a telephone system.

One of the objects of the present invention is to provide a novel and improved remote control method and circuit system which permits the control of the terminal circuit over a transmission system without interfering with the other functions of the transmission system.

Another object of the invention is to provide a novel and improved remote control method and circuit system which limits the control of the terminal circuit to an authorized user, or in other words, prevents a control of the terminal circuit, either accidentally or intentionally, by a non-authorized user.

Still another object of the invention is to provide a novel and improved remote control method and circuit system which utilizes the sound-transmitting properties of a telephone system to effect control of the terminal circuit by an authorized user and to prevent such control by a non-authorized user.

A further object of the invention is to provide a novel and improved remote control method and circuit system in which the terminal circuit is controlled by and can be controlled only by a pre-arranged sequence of signals constituting a signal code such as a sequence of timed sounds and silent intervals which manifest themselves in the flow of pulses and the absence of pulses respectively over the called subscriber's line.

A still further object of the invention is to provide a novel and improved remote control method and circuit system in which an authorized user of the system may freely change the signal code causing the actuation of the terminal circuit whenever such change in code is deemed advisable.

Yet a further object of the invention is to provide a novel and improved remote control method and circuit system in which a wrong signal code given by the person, authorized or not authorized, transmitting the code blocks subsequent completion of the code thereby further protecting the authorized user against misuse of the system.

Yet another object of the invention is to provide a novel remote control method and circuit system in which the system when blocked by an incorrect code signal is automatically released after a predetermined period of time. Such self-releasing system affords the advantage that a person knowing the correct code can transmit the code for control of the terminal circuit after the system has been temporarily blocked either by a mistake of a person knowing the code or by an unauthorized person.

The "terminal circuit" herein referred to, may be visualized as being connected, directly or indirectly, to any device, apparatus or installation capable of being actuated by the energization or de-energization of an electric or electronic circuit. The terminal circuit may serve to actuate an industrial or domestic appliance, a machine tool, to switch on or off a lighting fixture, etc. A housewife may, for instance turn on or off an electric stove, heater or air conditioner, etc., while away from home by simply calling the home telephone number and transmitting the code for which the receiving equipment in her home is pre-set. The terminal circuit may be utilized to actuate an automatic telephone answering installation.

The method and circuit system of the invention may be embodied by providing a stepping relay of conventional design, for which an energizing circuit is closed by the ringing signal over the subscriber's line and which is stepped in response to a sequence of pulses caused for instance by sounds emitted by the calling person and silent timed intervals. Upon completion of the code for which the receiving equipment is pre-set the stepping relay reaches a position in which a circuit for actuating the terminal circuit is completed.

Other and further objects, features and advantages of the invention will be pointed out hereinafter and set forth in the appended claims forming part of the application.

In the accompanying drawing several preferred embodiments of the invention are shown by way of illustration and not by way of limitation.

Figure 2:
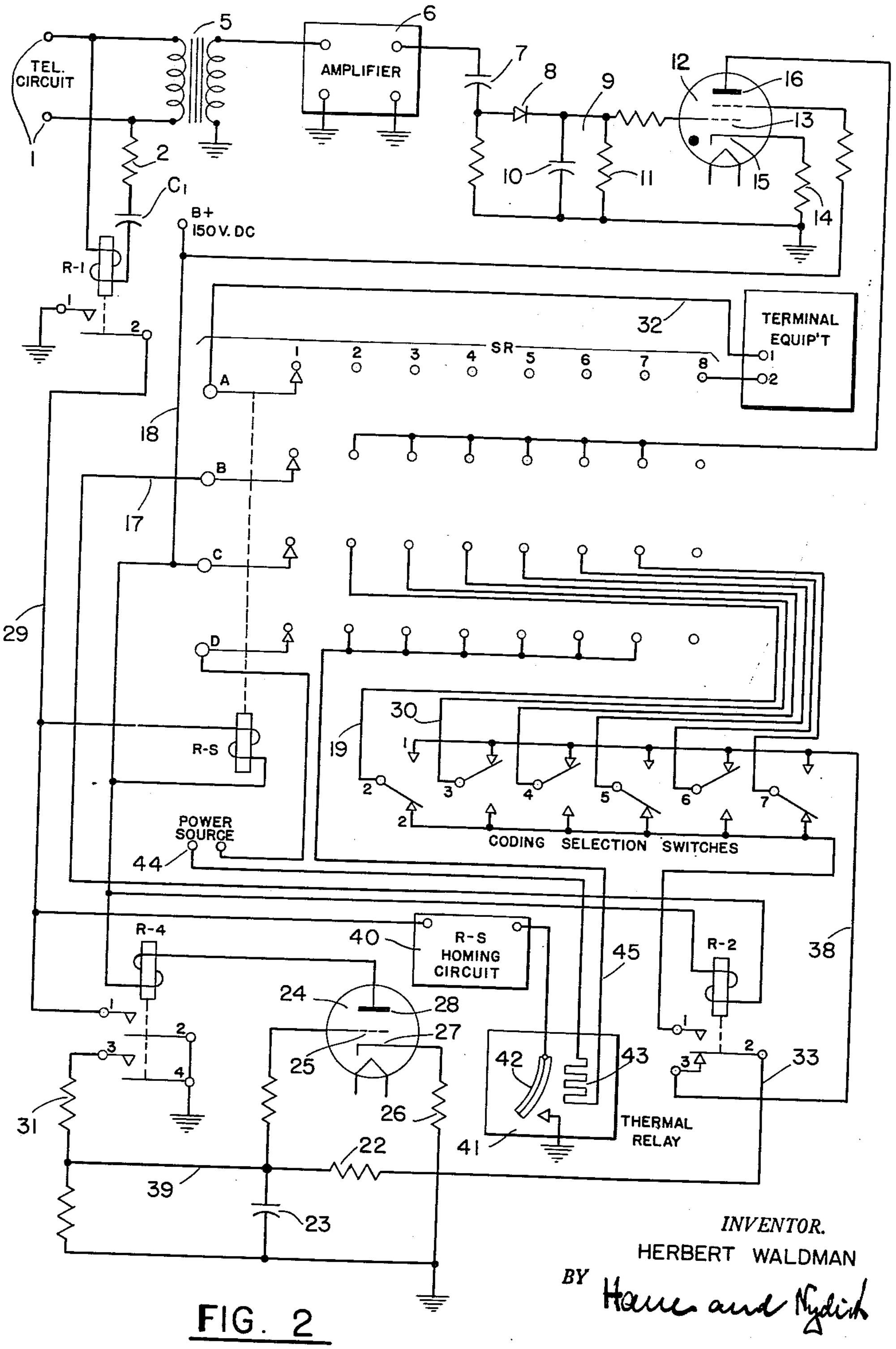

In the drawing:

FIG. 1 is a circuit diagram of a remote control system according to the invention which is blocked when a false code signal is given until released at the location of the system; and FIG. 2 is a circuit system of a remote control system which when blocked is self-releasing after a predetermined period of time.

Referring first to FIG. 1, the circuit diagram according to this figure shows the circuit system designed for coaction with the public telephone system. The circuit system should be visualized as being located at a called station, say for instance, in the home of a person, in an office, or a factory. The calling station is not shown as it does not require any special equipment. The circuit system may be actuated from any calling station by simply calling the number of the called station.

The receiving circuit system comprises basically a multiple position switch shown as stepping relays SR, which when stepped closes or opens intermediate circuits depending upon the received sequence of signals as will be more fully explained hereinafter. When a pre-set composite code signal is correctly transmitted the stepping relay is finally moved into a terminal switching position in which it actuates the circuit connections 1, 2 of the terminal equipment indicated by a labelled block. In the illustrated exemplifications of the invention, the code signal consists of a sequence of periods of sound and silence at timed intervals which may be changed at will by the person having control over the use of the receiving equipment as will be more fully explained hereinafter. The receiving equipment is started by a ringing signal at the called telephone set, or more specifically by the pulses causing the ringing signal which pulses have customarily a duration of two seconds.

The code signals transmitted over the incoming subscriber's line 1 are inductively fed to the circuit system over a transformer 5 and an amplifier 6. The incoming subscriber's line is further connected with the coil of a relay $R_1$ by a circuit including a resistor 2 and a capacitor $C_1$. This relay is the actuating or starting relay for the stepping relay SR. As is evident, the incoming code signals can be fed to the circuit system by any suitable other electric or an acoustic coupling. Similarly the actuating or starting relay $R_1$ may be coupled to the incoming subscriber's line by an electric, inductive or acoustic coupling. Relay $R_1$ controls normally open contacts 1 and 2. Resistor 2 and capacitor $C_1$ are preferably so dimensioned that relay $R_1$ will be actuated by one telephone ring, that is, by a flow of current to the incoming line for two seconds. After the first ring, the starting relay $R_1$ is disconnected from the incoming line by any suitable switching arrangement. Switching arrangements of this kind are well known in the art and not essential for the understanding of the invention. Closing of contacts 1—2 of relay $R_1$ closes the following circuit: ground, contacts 1—2, coil of a relay $R_s$ which is the actuating relay for the stepping relays SR and to B+ over line 18. As a result, the stepping relay is stepped from position 1 to position 2 in a manner well known.

The receiving circuit system is now ready to receive and to act upon the code signal given by the user at the calling station.

As mentioned before, the code signal consists of a prearranged sequence of sounds and silent intervals, each lasting say about three seconds. Each sound interval or silent interval given in the correct position in the sequence will cause the stepping relay to advance by one step. There are shown in the stepping relay coding selection switches numbered 2 to 7. Each of the selection switches comprises a movable contact arm which may make contact either with an upper contact 1 or a lower contact 2. In the exemplifications of the invention, engagement of a contact arm with its lower contact requires sound, and engagement with the upper contact requires silence in the sequence of signals. The user of the equipment may set the selection switches for any desired sequence. As shown, the sequence is sound-silence-silence-sound-silence-sound.

Let it now be assumed that the user at the calling station produces correctly a sound as the first signal of the pre-set code. The term "sound" is intended to designate any noise which the user chooses to apply to the mouthpiece of the handset in the calling station including the sound caused by a dialling operation. The resulting pulses over the subscriber's line 1 are fed to transformer 5, amplifier 6, a coupling capacitor 7, a rectifier 8 and a time-delay network 9, including a capacitor 10 and a resistor 11. The capacitor 10 and resistor 11 are so dimensioned that they cause a time delay of about half a second before a thyratron tube 12 can be fired. This tube is normally blocked by the negative bias at its control grid 13. It is rendered conductive by the positive charge at the respective electrode of capacitor 10 which neutralizes the negative bias of grid 13. The purpose of the time-delay network is to prevent any stray pulses from firing the thyratron tube. The firing of the tube closes the following circuit: ground, a resistor 14, cathode 15 of the thyratron, plate 16 of the thyratron, contact 2 of the stepping relay SR, relay arm B of stepping relay SR, lead 17, coil of a relay $R_2$, and lead 18 to B+. As a result relay $R_2$ attracts its contact arms 2 and 5 thereby closing the following circuit: B+, lead 18, contact arm C of the stepping relay, contact 2 of the stepping relay, lead 19, coding selection switch arm 2, lead 20, contact 4, contact arm 5 of relay $R_2$, lead 21, normally closed contacts 2—1 of a relay $R_3$, a resistor 22 and a capacitor 23 to ground. Capacitor 23 and resistor 22 are dimensioned to form a time-delay network causing a time-delay of three seconds before a tube 24 can fire due to the neutralization of the negative charge of its control grid 25 which is connected to the time-delay network 22—23.

As is well known, a D.-C. operated thyratron such as thyratron 12 has a characteristic such that the tube when fired will continue to be conductive until its plate voltage is momentarily removed. Consequently, relay $R_2$ will remain energized after having been initially energized by pulses representing a sound of at least one-half second which represents the delay caused by network 10, 11. As a result, the respective electrode of capacitor 23 continues to be positively charged over contacts 4 and 5 of relay $R_2$. At the end of the time-delay period of three seconds introduced by the network 22, 23 the accumulated positive charge at the respective electrode of capacitor 23 will neutralize the negative bias of grid 25 of tube 24. The tube 24 now fires thereby closing an energizing circuit for a relay $R_4$ as follows: ground, resistor 26, cathode 27 of tube 24, plate 28 of tube 24, the coil of relay $R_4$ and lead 18 to B+. As a result, relay $R_4$ attracts its contact arms 2 and 4 thereby closing the following circuit: ground, contacts 2—1 of relay $R_4$, lead 29, the coil of the stepping relay SR and lead 18 to B+. The stepping relay now steps from position 2 to position 3.

The energization of relay $R_4$ also closes the following circuit: positively charged electrode of capacitor 23, lead 39, resistor 31, contacts 3—4 of relay $R_4$, and through ground to the negative electrode of capacitor 23. The capacitor now discharges thereby restoring tube 24 to its initial non-conductive condition.

When and while the stepping relay steps from one position to the next the plate circuit of thyratron 12 is momentarily disconnected thereby restoring the thyratron tube also to its initial non-conductive condition.

As previously pointed out, the position 3 of the stepping relay calls for silence for three seconds, coding selection switch 3 being in the upper position.

At the end of three seconds of silence the following circuit is closed: B+, lead 18, contact arm C of stepping relay RS, stepping relay contact 3, lead 30, selection switch 3, lead 38, contacts 6—5 of relay $R_2$, lead 21, contacs 2—1 of relay $R_3$, resistor 22 and capacitor 23.

At the end of three seconds tube 24 is again fired as previously described thereby re-energizing relay $R_4$. As relay $R_4$ closes its contacts, the coil of the stepping relay SR is energized as also previously described thereby causing the relay to step from position 3 to position 4. Finally, the capacitor 23 is again discharged over the previously described circuit closed through the contacts 3—4 of relay $R_4$.

In this manner, the stepping relay may be stepped through to position 8 in response to the correct sequence of code signals. The position 8 is the terminal switching position in which the terminal circuit is actuated through the following circuit: terminal equipment terminal 1, lead 32, contact arm A of the stepping relay, contact 8 of the stepping relay and terminal 2 of the terminal equipment.

The time intervals of three seconds between each two signals, whether sound or silence, may be readily checked by means of a watch.

Let it now be assumed that the user at the calling station applies the wrong code to the mouthpiece, either due to an error or to unfamiliarity with the correct code. In such event, the stepping relay will remain in the position in which it was when the wrong signal was given, that is, it may stop in any of the positions 2 to 7.

As stated before the position of the coding selection switch 2 calls for a sound. Let it now be assumed that the user remains silent. Then the following circuit will be closed; B+ to lead 18, contact arm C of relay SR, contact 2 of relay SR, lead 19, coding switch 2, lead 20, contacts 3—2 of relay $R_2$, lead 33, resistor 34 and capacitor 35. Resistor 34 and capacitor 35 constitute a time-delay network such that capacitor 35 requires two seconds to become charged. The error thus committed cannot be rectified since even if sound were now transmitted, the resulting pulses will not cause stepping of the stepping relay. The pulses caused by the sound instead of causing stepping will break the connection from B+ to capacitor 23 over the following circuit: the wrongly timed pulses are fed through transformer 5, amplifier 6, coupling capacitor 7, rectifier 8 and time-delay network 9 to the control grid 13. Thyratron 12 when fired by the positive charge of the respective electrode of capacitor 10 energizes the coil circuit of relay $R_2$ as previously described. As a result relay $R_2$ closes its contacts thereby establishing a discharge circuit for the previously charged capacitor 35, including the coil of relay $R_3$ thereby energizing the latter over the following circuit: capacitor 35, resistor 34, lead 33, contacts 2—1 of relay $R_2$, lead 36 and the coil of relay $R_3$ back to capacitor 35. Relay $R_3$ now opens its contacts 2—1 thereby interrupting the connection from B+ to capacitor 23. As indicated in the drawing by a hook 37 relay $R_3$ is a latching relay which will latch its contact arm 2 in its attracted position.

The entire system is now blocked. Relay $R_3$ must be manually released by an authorized user at its location and the stepping relay must also be re-set to the initial position shown in the figure.

Let it now be assumed that the user makes a sound where the sequence of signals calls for a silent interval as is the case in the position 3 of the stepping relay. Thyratron 12 will be fired by the pulses caused by the sound as previously described. As a result, relay $R_2$ is energized as also previously described.

In the position 3 the respective contact arm of the coding selection switch 3 makes contact with its upper contact 1. As a result B+ is connected over lead 18, stepping relay contact arm C and leads 30 and 38, contacts 6—5 of relay $R_2$, line 21, contacts 2—1 of relay $R_3$, resistor 22 to capacitor 23. This energizing circuit is interrupted at contacts 5—6 upon energization of relay $R_2$, thereby also interrupting the energizing circuit for capactior 23. Consequently this capacitor cannot be charged for firing tube 24. Thyratron 12 will continue to be conductive thereby maintaining the energization of the relay $R_2$ until its plate voltage is temporarily removed. This in turn will not occur until the stepping relay is re-set.

As appears from the previous description, the system according to FIG. 1 remains blocked until released by the afore-described operations, that is, the system cannot be used by anyone including the person knowing the correct code, and the release can be effected only at the location of the system, for instance in the home of a person.

FIG. 2 shows a self-releasing system which frees itself after a predetermined period of time when blocked by a wrong signal. Such system affords the advantage that a person knowing the code can operate the terminal equipment from a remote point after the system has been blocked either by his own mistake or by an attempt of unauthorized use.

The circuit system of FIG. 2 is basically the same as that of FIG. 1 and the same reference characters are used to designate corresponding components. The system of FIG. 2 is distinguished from the system of FIG. 1 by the omission of latching relay $R_3$ and the attendant components such as contacts 4, 5, and 6 of relay $R_2$. Instead the circuit of FIG. 2 includes an RS homing circuit 40 of conventional design. As is well understood such homing circuit serves to return the stepping relay from any switching position into its initial position. The homing circuit is controlled by a timing device 41. This timing device may be of any design known and suitable for the purpose such as a time clock. By way of example and for purpose of simplification of the illustration it is shown as a thermal relay including a bimetal switch 42 which is biased into the open position when cold. The bimetal switch is controlled by a heating element 43, one terminal of which is connected to a suitable power source 44 and the other terminal of which is connected by a lead 45 to a fourth contact arm D of stepping relay SR. As is evident the heating circuit of switch 42 is closed in each of the stepping positions 2 through 7. The closing time of switch 42 when heated may be set for any suitable period of time that is in excess of the time required for the stepping of the stepping relay into its terminal position when the code is correctly applied. Preferably a certain leeway is allowed as to the regular stepping time. As described in connection with FIG. 1 the interval between each two signals is three seconds, that is, eighteen seconds are required to move the stepping relay from position 2 to position 7. Accordingly, a timing of 25 seconds for switch 42 would be suitable.

The general operation of the system according to FIG. 2 is evident from the previous description. Let it now be assumed that the stepping relay is stopped in position 3 due to a wrong signal. Then switch 42 will energize the homing circuit at the end of its allotted time and the homing circuit will return the stepping relay into its initial position in a conventional manner. The system is now free for the renewed transmission of the code by a person familiar with the required sequence of signals.

As appears from the previous description, the circuit system of the invention safeguards against erroneous application of the code signals irrespective of whether the error is of applying sound or silence at the wrong time. While the safety features have been described for positions 2 and 3 only, obviously they apply to all other positions of the stepping relay also.

While the invention has been described in detail with respect to certain now preferred examples and embodiments of the invention, it will be understood by those skilled in the art after understanding the invention, that various changes and modifications may be made without departing from the spirit and scope of the invention and it is intended therefore, to cover all such changes and modifications in the appended claims.

What is claimed as new and desired to be secured by Letters Patent is:

1. A remote control apparatus for controlling a terminal circuit at a controlled station from a control station connected to the controlled station over a signal transmission circuit also used for transmitting signals other than control signals for the terminal circuit, said apparatus comprising a multiple position switching device unidirectionally movable through intermediate positions between a starting switching position and a terminal switching position actuating said terminal circuit, circuit means at the controlled station for connecting said switching device to a source of current in response to a starting signal from the control station over said transmission circuit, and a plurality of control circuit means each controlling movement into one of the intermediate switching positions of said switching device and each energized in response to a signal over the transmission circuit and also in response to a no-signal received for a predetermined period of time over the transmission circuit to activate the switching device for movement through the intermediate positions toward the terminal switching position, a pre-set sequence of said signals and no-signals energizing said control circuit means to effect movement of the switching device into said terminal switching position for actuating the terminal circuit.

2. A remote control apparatus for controlling the terminal circuit at a telephone subscriber's station from any telephone apparatus connectable to the telephone apparatus in the subscriber's station, said control apparatus comprising a multiple position switching device unidirectionally movable through intermediate positions between a starting switching position and a terminal switching position actuating said terminal circuit, energizing circuit means at the subscriber's station responsive to a ringing pulse received at the subscriber's station from a calling telephone apparatus for connecting the switching device to a source of current, and a plurality of control circuit means at the subscriber's station each controlling movement of the switching device into one of the intermediate switching positions and each energized in response to a signal received at subscriber's station and also in response to a no-signal for a predetermined period of time received at the subscriber's station to activate said switching device for movement through the intermediate positions toward said terminal switching position, a pre-set sequence of said signals and no-signals energizing said control circuit means to effect movement of the switching device into said terminal switching position for actuating the terminal circuit.

3. A remote control apparatus for controlling a terminal circuit at a controlled station from a control station connected to the controlled station over a signal transmission circuit also used for transmitting signals other than control signals for the terminal circuit, said apparatus comprising a multiple-step stepping relay means having a terminal stepping position actuating said terminal circuit, switch means at the controlled station connecting said stepping relay means to an energizing circuit in response to a starting signal from the control station over said transmission circuit, and a plurality of control circuit means each controlling into one of the intermediate stepping positions of said stepping relay means in response to the reception of a signal over said transmission circuit and also in response to a no-signal for a predetermined period of time over the transmission circuit for unidirectional movement from the respective intermediate stepping position toward the terminal stepping position, a pre-set sequence of said pre-determined signals and no-signals energizing said control circuit means to effect movement of the stepping relay means into said terminal stepping position for actuating the terminal circuit.

4. A remote control apparatus for controlling the terminal circuit at a telephone subscriber's station from any telephone apparatus connectable to the telephone apparatus in the subscriber's station, said control apparatus comprising a multi-step stepping relay means having a terminal stepping position actuating said terminal circuit, energizing circuit means at the subscriber's station responsive to a ringing pulse received at the subscriber's station from a calling telephone apparatus for connecting the stepping relay means to an energizing circuit, and a plurality of control circuit means at the subscriber's station each controlling stepping into one of the intermediate stepping positions and each energized in response to a signal received at the subscriber's station and also in response to a no-signal for a predetermined period of time received at the subscriber's station to activate said stepping relay means for unidirectional movement from the respective intermediate stepping position toward said terminal stepping position, a pre-set sequence of said predetermined signals and no-signals energizing said control circuit means to effect movement of the stepping relay means into said terminal stepping position for actuating the terminal circuit.

5. A remote control apparatus for controlling a terminal circuit at a controlled station from a control station connected to the cnotrolled station over a signal transmission circuit also used for transmitting signals other than control signals for the terminal circuit, said apparatus comprising a multiple switching device movable between a starting switching position and a terminal switching position actuating said terminal circuit, circuit means at the controlled station for connecting said switching device to a source of current in response to a starting signal from the control station over said transmission circuit, a plurality of control circuit means each controlling movement into one of the intermediate switching positions of said switching device and each energized in response to a signal received over the transmission circuit and also in response to a no-signal received for a predetermined period of time over the transmission circuit to activate the switching device for movement from the respective intermediate position toward the terminal switching position, a pre-set sequence of said predetermined signals and no-signals energizing said control circuit means to effect movement of the switching device into said terminal switching position for actuating the terminal circuit, check circuit means energized in response to a signal over said transmission circuit other than a signal in said pre-set sequence, and check switch means actuated by the energization of the said check circuit means for rendering said control circuit means inoperative to block switching of said switching device in response to subsequent signals in said sequence.

6. A remote control apparatus for controlling the terminal circuit at a telephone subscriber's station from any telephone apparatus connectable to the telephone apparatus in the subscriber's station, said control apparatus comprising a multiple position switching device movable through intermediate positions between a starting switching position and a terminal switching position actuating said terminal circuit, energizing circuit means at the subscriber's station responsive to a ringing pulse received at the subscriber's station from a calling telephone apparatus for connecting the switching device to a source of current, a plurality of control circuit means at the subscriber's station each controlling movement into one of the intermediate switching positions and each being energized in response to a signal received at the subscriber's station and also in response to a no-signal received at the subscriber's station for a predetermined period of time to activate said switching device for movement from the respective intermediate position toward said terminal switching position, a pre-set sequence of said predetermined signals and no-signals energizing said control circuit means to effect movement of the switching device into said terminal switching position for actuating the terminal circuit, check circuit means energized in response to a signal received at the subscriber's station other than a signal in said pre-set sequence, and check switch means actuated by the energization of said check circuit means for rendering said control circuit means inoperative to block switching of said switching device in response to subsequent signals in said sequence.

7. A remote control apparatus according to claim 5 wherein said check switch means comprise a latch means locking said check switch means upon actuation thereof by a signal energizing the check circuit means.

8. A remote control apparatus for controlling a terminal circuit at a controlled station from a control station connected to the controlled station over a signal transmission circuit also used for transmitting signals other than control signals for the terminal circuit, said apparatus comprising a multiple position switching device unidirectionally movable through intermediate positions between a starting switching position and a terminal switching position actuating said terminal circuit, circuit means at the controlled station for connecting said switching device to a source of current in response to a starting signal from the control station over said transmission circuit, a plurality of control circuit means each controlling movement into one of the intermediate switching positions of said switching device and each energized in response to a signal received over the transmission circuit and also in response to a no-signal for a predetermined period of time received over the transmission circuit to activate the switching device for movement from the respective intermediate position toward the terminal switching position, a pre-set sequence of said predetermined signals and no-signals energizing said control circuit means to effect movement of the switching device into said terminal switching position for actuating the terminal circuit, homing means for returning the switching device into its starting position from any switched position and time controlled actuating means actuating said homing means a predetermined period of time after movement of the switching device into the first intermediate switching position.

9. A remote control apparatus according to claim 5 and further comprising time-controlled actuating means including an electric timing device connected in an energizing circuit by said switching device in any switched position thereof other than the terminal position, said timing device closing an energizing circuit for said homing means a predetermined period of time after being energized.

10. A remote control apparatus according to claim 9 wherein said timing device comprises a normally open bimetal switch in the energizing circuit of the homing means and a heating means for said bimetal switch included in an energizing circuit upon operation of the switching device.

11. A remote control apparatus according to claim 10 wherein said switching device comprises a stepping relay, said stepping relay including a bank of contacts, one bank contact for each intermediate stepping position and each of said intermediate bank contacts connecting said time controlled actuating means in an energizing circuit in the respective position of the stepping relay, each of said energizing circuits causing activation of the actuating means for actuating the homing means after said predetermined period of time.

12. A remote control apparatus according to claim 11 wherein said control circuit means include delay network means limiting each signal in said sequence to a predetermined period of time.

13. A remote control apparatus according to claim 12 wherein said time controlled actuating means are set to actuate said homing means after a period of time in excess of the total time set for the completion of said sequence of signals.

14. A remote control apparatus according to claim 5, wherein said switching device comprises several signal sequence selecting switches included in said control circuit means, said selecting switches being individually settable, the setting of said switches determining the sequence of signals causing the movement of said switching device into said terminal position.

References Cited in the file of this patent

UNITED STATES PATENTS

| | | |
|---|---|---|
| 2,553,410 | Handschin | May 15, 1951 |
| 2,709,202 | Handschin | May 24, 1955 |
| 2,773,123 | Handschin | Dec. 4, 1956 |
| 2,787,659 | Horwitz et al. | Apr. 2, 1957 |
| 2,810,017 | Tyszkiewicz | Oct. 15, 1957 |
| 2,824,776 | Elovic et al. | Feb. 25, 1958 |

FOREIGN PATENTS

| | | |
|---|---|---|
| 725,902 | Great Britain | Mar. 9, 1955 |